United States Patent [19]

Naito et al.

[11] Patent Number: 5,019,987
[45] Date of Patent: May 28, 1991

[54] CRUISE CONTROL APPARATUS FOR A VEHICLE

[75] Inventors: Yasuo Naito; Kazuyori Katayama; Hiroyuki Kouzuki, all of Himeji, Japan

[73] Assignee: Mitsubishi Denki Kabushiki Kaisha, Tokyo, Japan

[21] Appl. No.: 440,185

[22] Filed: Nov. 22, 1989

[30] Foreign Application Priority Data

Dec. 23, 1988 [JP] Japan ................... 63-327131

[51] Int. Cl.$^5$ .............................................. B60K 31/00
[52] U.S. Cl. ................... 364/426.04; 180/179
[58] Field of Search .............. 364/426.04, 424.01; 180/170, 179

[56] References Cited

U.S. PATENT DOCUMENTS

| | | | |
|---|---|---|---|
| 4,540,060 | 9/1985 | Kawata et al. | 180/179 |
| 4,591,986 | 5/1986 | Nakajima et al. | 364/426.04 |
| 4,622,636 | 11/1986 | Tachibana | 364/426.04 |
| 4,829,438 | 5/1989 | Etoh | 364/426.04 |
| 4,833,612 | 5/1989 | Okuno et al. | 364/426.04 |
| 4,931,939 | 6/1990 | Kawata et al. | 364/426.04 |

Primary Examiner—Thomas G. Black
Attorney, Agent, or Firm—Sughrue, Mion, Zinn, Macpeak and Seas

[57] ABSTRACT

A cruise control apparatus for a vehicle is disclosed which is highly reliable in operation and in which a target speed stored can be checked, and if there is any error in the stored target speed, cruise control is automatically inhibited or cancelled. In one embodiment, the vehicle speed sensed by a speed sensor is stored in a first area of a RAM as a first target speed and in a second area as a second target speed. A comparator compares the first target speed and the second target speed and outputs either one of the target speeds as a final target speed if the target speeds are equal to each other but outputs the lower one of the target speeds as the final target speed if there is disagreement therebetween. A cruise controller connected to receive the output of the comparator is adapted to be externally set into operation for controlling a throttle actuator in such a manner that a throttle valve is moved to a target degree of opening which corresponds to the final target speed. If there is disagreement between the first and second target speeds, the cruise controller is inhibited from being set into operation once cruise control has been cancelled. In another embodiment, the cruise control operation of the cruise controller is automatically cancelled if there is disagreement between the first and second target speeds.

2 Claims, 3 Drawing Sheets

CRUISE CONTROL APPARATUS FOR A VEHICLE

BACKGROUND OF THE INVENTION

The present invention relates to a cruise control apparatus for a vehicle which is capable of making the vehicle travel at a predetermined constant speed in an automatic manner.

There has been known a conventional cruise control apparatus for a vehicle in which the target speed at which the vehicle is to travel is determined as the speed of the vehicle sensed by a speed sensor at the instant when the operator turns on a cruise control switch. The target speed thus determined is then stored in a RAM in a microcomputer. Based on the present speed as continuosly sensed by the speed sensor every second and the target speed, an amount of opening of a throttle valve in the intake manifold of the engine which corresponds to the target speed is calculated by the microcomputer. Then, the throttle valve is set to the thus calculated opening amount through the action of an actuator so that the speed of the vehicle is adjusted to the target speed.

However, with the conventional cruise control apparatus constructed in the above manner, if the microcomputer writes, due to external noise or the like, into the RAM incorrect data different from the correct data for the target speed, the cruise control apparatus operates to maintain a speed level different from the target speed.

SUMMARY OF THE INVENTION

The present invention is intended to obviate the above problem encountered in the conventional cruise control apparatus.

An object of the present invention is to provide a novel and improved cruise control apparatus for a vehicle which is highly reliable in operation.

Another object of the present invention is to provide a novel and improved cruise control apparatus in which a target speed stored can be checked and in which, if there is any error in the stored target speed, cruise control is automatically inhibited or cancelled.

According to one aspect of the present invention, there is provided a cruise control apparatus for a vehicle having a throttle valve and a throttle actuator comprising:

a speed sensor for sensing the speed of the vehicle;

memory means for storing the vehicle speed sensed by the speed sensor in a first area as a first target speed and in a second area as a second target speed;

comparison means for comparing the first target speed and the second target speed and outputting either one of the target speeds as a final target speed if the target speeds are equal to each other but outputting the lower one of the target speeds as the final target speed if there is disagreement therebetween;

cruise control means connected to receive the output of the comparison means and adapted to be externally set into operation for controlling the throttle actuator in such a manner that the throttle valve is moved to a target degree of opening which corresponds to the final target speed;

cruise control cancellation means adapted to be externally operated to cancel the cruise control operation of the cruise control means; and cruise control inhibition means operable to inhibit the cruise control means from being set into operation after the cruise control cancellation means is operated if there is disagreement between the first and second target speeds.

According to another aspect of the present invention, there is provided a cruise control apparatus for a vehicle having a throttle valve and a throttle actuator comprising:

a speed sensor for sensing the speed of the vehicle;

memory means for storing the vehicle speed sensed by the speed sensor in a first area as a first target speed and in a second area as a second target speed;

comparison means for comparing the first target speed and the second target speed and outputting either one of the target speeds as a final target speed if the target speeds are equal to each other but outputting the lower one of the target speeds as the final target speed if there is disagreement therebetween;

cruise control means connected to receive the output of the comparison means and adapted to be externally set into operation for controlling the throttle actuator in such a manner that the throttle valve is moved to a target degree of opening which corresponds to the final target speed; and cruise control cancellation means operable to cancel the cruise control operation of the cruise control means if there is disagreement between the first and second target speeds.

The above and other objects, features and advantages of the present invention will become apparent from the following detailed description of presently preferred embodiments of the invention taken in conjunction with the accompanying drawings.

DESCRIPTION OF THE PREFERRED EMBODIMENTS

The present invention will now be described in detail with reference to preferred embodiments thereof as illustrated in the accompanying drawings.

Figure 1:
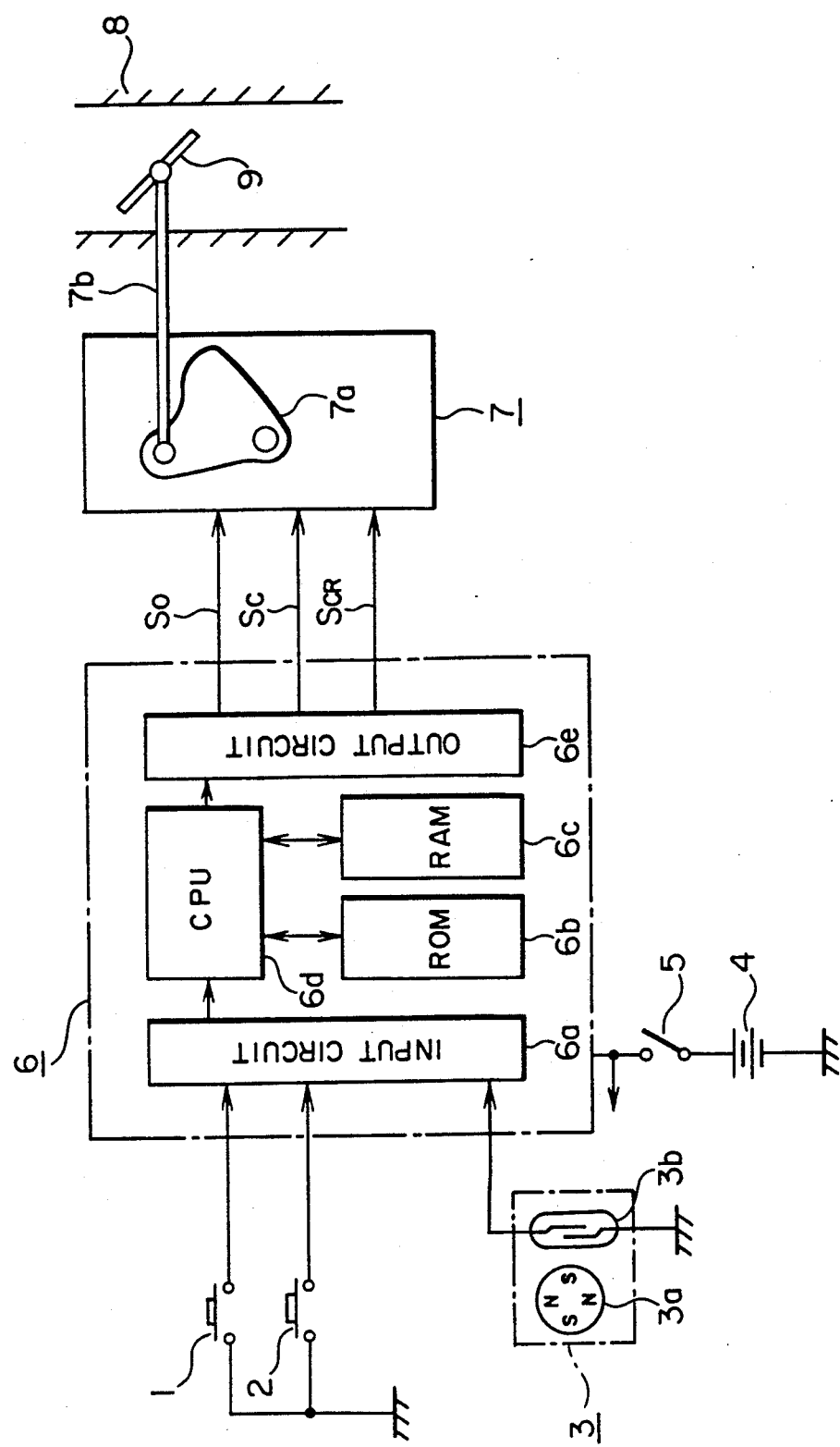
FIG. 1 is a schematic illustration showing the general construction of a cruise control apparatus for a vehicle in accordance with the present invention.

Referring to the drawings and first to FIG. 1, there is illustrated the general arrangement of a cruise control apparatus for a vehicle constructed in accordance with the present invention. The cruise control apparatus as illustrated includes a command switch 1 which is adapted to be operated by an operator so as to start cruise control, a cancel switch 2 which, when operated by the operator, serves to cancel cruise control, the switches 1 and 2 having one end commonly grounded, and a speed sensor 3 for sensing the speed of the vehicle and including a rotary member 3a with four magnetic poles and a reed switch 3b having one end grounded, the rotary member 3a being operatively connected with a transmission through a metering cable for rotation around its central axis so that it outputs a signal composed of a series of pulses with a frequency proportional to the speed at which the vehicle is running. A control unit 6 in the form of a microcomputer has a power supply terminal coupled to a source of electricity through a power switch 5 in the form of a main switch.

Figure 2:
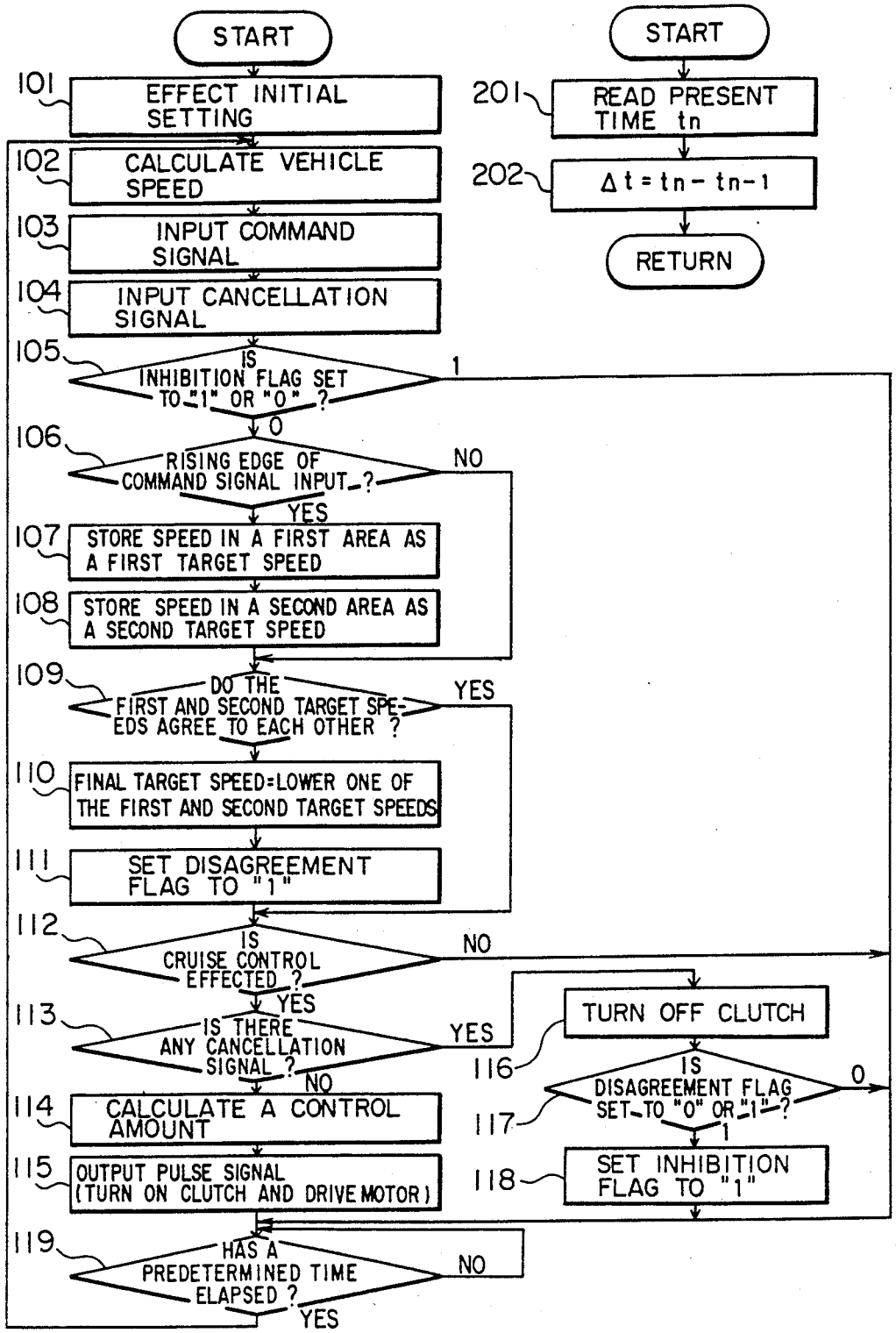
FIG. 2(a) is a flowchart showing the main operational process or main routine executed by a CPU of a microcomputer illustrated in FIG. 1.
FIG. 2(b) is a flowchart showing an interrupt routine executed by the CPU of FIG. 1.

The microcomputer 6 has an input circuit 6a connected to receive the outputs of the command switch 1, the cancel switch 2 and the speed sensor 3, a ROM 6b having a control program stored therein for executing an operational process as illustrated in FIGS. 2(a) and 2(b), a RAM 6c serving as a working memory, a CPU 6d connected to the input circuit 6a for processing the output signals therefrom and effecting certain calculations and generating output signals, and an output circuit 6e connected to receive the output signals of the CPU 6d for outputting control signals to the exterior.

A throttle actuator 7, in the form of a well-known motor-driven type throttle actuator, receives the output signals of the output circuit 6e and in response thereto drivingly adjusts the opening degree of a throttle valve 9 disposed in an intake manifold 8 of an internal combustion engine and which is operatively connected with an accelerator pedal (not shown). The throttle actuator 7 including a motor (not shown) has an arm or link 7a in the shape of a sector which is mounted at its center on a rotary shaft operatively connected with the output shaft of the motor for rotation therewith. The sector-shaped link 7a is connected at its peripheral point radially spaced from the center thereof with a rod 7b at its one end. The rod 7b is in turn connected at its other end with the throttle valve 9 in such a manner that the throttle valve 9 is forced to move in the closing or opening direction as the motor drives the sector-shaped link 7a to rotate in one or the other rotational direction. Though not illustrated, a clutch in the form of an electromagnetic clutch is housed in the actuator 7 at a location between the link 7a and the unillustrated motor for making and breaking the operative connection therebetween. The operation of the clutch is controlled by an electromagnetic clutch signal Scr which is outputted from the output circuit 6e of the microcomputer 6.

The operation of the above-described embodiment will next be described with reference to FIG. 1. First, the operator turns on the main switch 5 so that power is supplied from the source of electricity 4 to the microcomputer 6. Thus, the microcomputer 6 starts to operate and process the output signal of the speed sensor 3, which is in the form of a series of pulses having a frequency proportional to the speed of the vehicle Vs. The microcomputer 6 calculates the frequency of the output pulses of the speed sensor 3 and calculates the speed of the vehicle based on the frequency thus calculated.

When the operator manipulates (turns on) the command switch 1, a command signal is sent from the command switch 1 to the microcomputer 6 so that the speed Vs at which the vehicle is running at that time is written into two different memory areas (first and second memory areas) of the RAM 6c as a first and a second target speed, respectively, and at the same time cruise control is started. The microcomputer 6 determines whether the thus stored two target speeds read out from the above two memory areas of the RAM 6c are equal to each other, and if they are equal, either one of the stored speeds is used as a final target speed Vr, whereas if not, the smaller of the two is used as the final target speed Vr. The microcomputer 6 generates a control signal based on the thus determined target speed Vr and the actual speed Vs of the vehicle, which is continuously detected by the speed sensor 3 every second, and applies the control signal to the throttle actuator 7 so that the throttle actuator 7 is thereby driven to move to such a degree of opening as to make the vehicle travel at the target speed Vr. More specifically, when the actual speed Vs of the vehicle is less than the target speed Vr, the microcomputer 6 operates to output a throttle opening drive signal So so as to open the throttle valve 9 by an appropriate degree, whereas when the actual speed Vs is greater than the target speed Vr, the microcomputer 6 outputs a throttle closing drive signal Sc so as to close the throttle valve 9 by an appropriate degree. In this case, at the instant when cruise control starts, the microcomputer 6 issues a clutch actuation signal Scr so that the electromagnetic clutch in the throttle actuator 7 is placed into engagement. Accordingly, the vehicle can travel at a predetermined constant speed without operation of the accelerator pedal.

When the operator turns on the cancellation switch 2 during a cruise control operation, there is produced a cruise control cancellation signal which is sent to the microcomputer 6, which in response releases (disengage) the electromagnetic clutch in the throttle actuator 7 to thereby stop cruise control. On the other hand, when the first and second target speeds read out from the RAM 6c are not equal to each other during the cruise control operation, an inhibition flag is set in the RAM 6c for inhibiting cruise control from being set, even upon issuance of the following cruise control command signal.

In the following, the operation of the CPU 6d of the microcomputer 6 will be more specifically described with particular reference to FIGS. 2(a) and 2(b). First in Step 101, the RAM 6c is cleared to an initial setting wherein, for example, all flags previously set in the RAM 6c are cleared. Then, in Step 102, the speed of the vehicle is calculated based on the period of the pulses outputted from the speed sensor 3 (as will be described later with reference to FIG. 2(b)). In Step 103, a cruise control command signal, which contains a pulse when the command switch 1 is turned on by the operator, is inputted to the CPU 6d, and in Step 104 a cruise control cancellation signal, which contains a pulse when the cancellation switch 2 is turned on by the operator is inputted to the CPU 6d. Subsequently in Step 105, it is determined whether a cruise control inhibition flag in the form of "1" is set in the RAM 6c. If the answer is "YES", the control process proceeds to Step 119, but if "NO", the control process proceeds to Step 106 where it is determined whether a rising edge of the command signal inputted to the CPU 6d in Step 103 has been sensed. If there is no rising edge, the control process proceeds to Step 109. On the other hand, if there is a rising edge, a cruise control flag is set to "1" in the RAM 6c, indicating that the vehicle is running under cruise control, and thereafter the control process proceeds to Step 107 where the speed of the vehicle calculated in Step 102 is written as a first target speed in the first memory area in the RAM 6c. Then in Step 108, the same speed is written as a second target speed in the second memory area in the RAM 6c. In Step 109, the first and second target speeds thus written are read out from the first and second memory areas in the RAM 6c so as to determine whether they are equal. If the answer is "YES", the control process proceeds to Step 112, but if "NO" the control process proceeds to Step 110 where the smaller one of the two speeds is set as the final target speed. Thereafter, in Step 111, a disagreement flag is set to "1" in the RAM 6c. In Step 112, it is determined from the cruise control flag whether cruise control is effected, and if the cruise control flag is set to "1", the answer is "YES", and if otherwise, "NO". If the answer is "NO" in Step 112, then the control process proceeds to Step 119, but if "YES", the control process proceeds to Step 113 where it is determined whether a cruise control cancellation signal has been inputted to the RAM 6c. If the answer is "YES", the cruise control flag is reset to "0", and then the control process proceeds to Step 116. On the other hand, if the answer is "NO", the control process proceeds to Step 114 where a control amount necessary for moving the throttle valve 9 to a proper degree of opening is calculated based on the above-calculated actual speed of the vehicle and the previously determined final target speed. Then, in Step 115, the CPU 6d outputs to the throttle actuator 7 an appropriate control signal, such as a pulse corresponding to the calculated control amount, so as to adjust the opening degree of the throttle valve 9. Thereafter, the control process proceeds to Step 119.

On the other hand, in Step 116, the unillustrated electromagnetic clutch in the throttle actuator 7 is turned off (disengaged), and then in Step 117 it is determined whether the disagreement flag is set to "1". If the answer is "NO", the control process proceeds to Step 119, but if "YES" the control process proceeds to Step 118 where a cruise control inhibition flag is set to "1" in the RAM 6c. Then, the control process proceeds to Step 119. In Step 119, it is determined whether a predetermined period of time has elapsed, and if the answer is "YES", then the control process returns to Step 102, but if not, the process waits a predetermined time and then returns to Step 102. Thereafter, the same operational steps are repeated in the same manner as discussed above.

The above-described main routine is interrupted every time the output pulse of the speed sensor 3 rises, and an interrupt routine as illustrated in FIG. 2(b) is executed in the following manner. First in Step 201, the present time $t_u$ at which the present interrupt routine is executed is read out, and in Step 202, the period $\Delta t$ between the present time $t_n$ and the previous time $t_{n-1}$ at which the previous interrupt routine was executed is calculated and stored in the RAM 6c. This period $\Delta t$ is used for calculating the actual speed of the vehicle in Step 102 of FIG. 2(a). Thereafter, the interrupt routine ends and the control process returns to the main routine.

Figure 3:
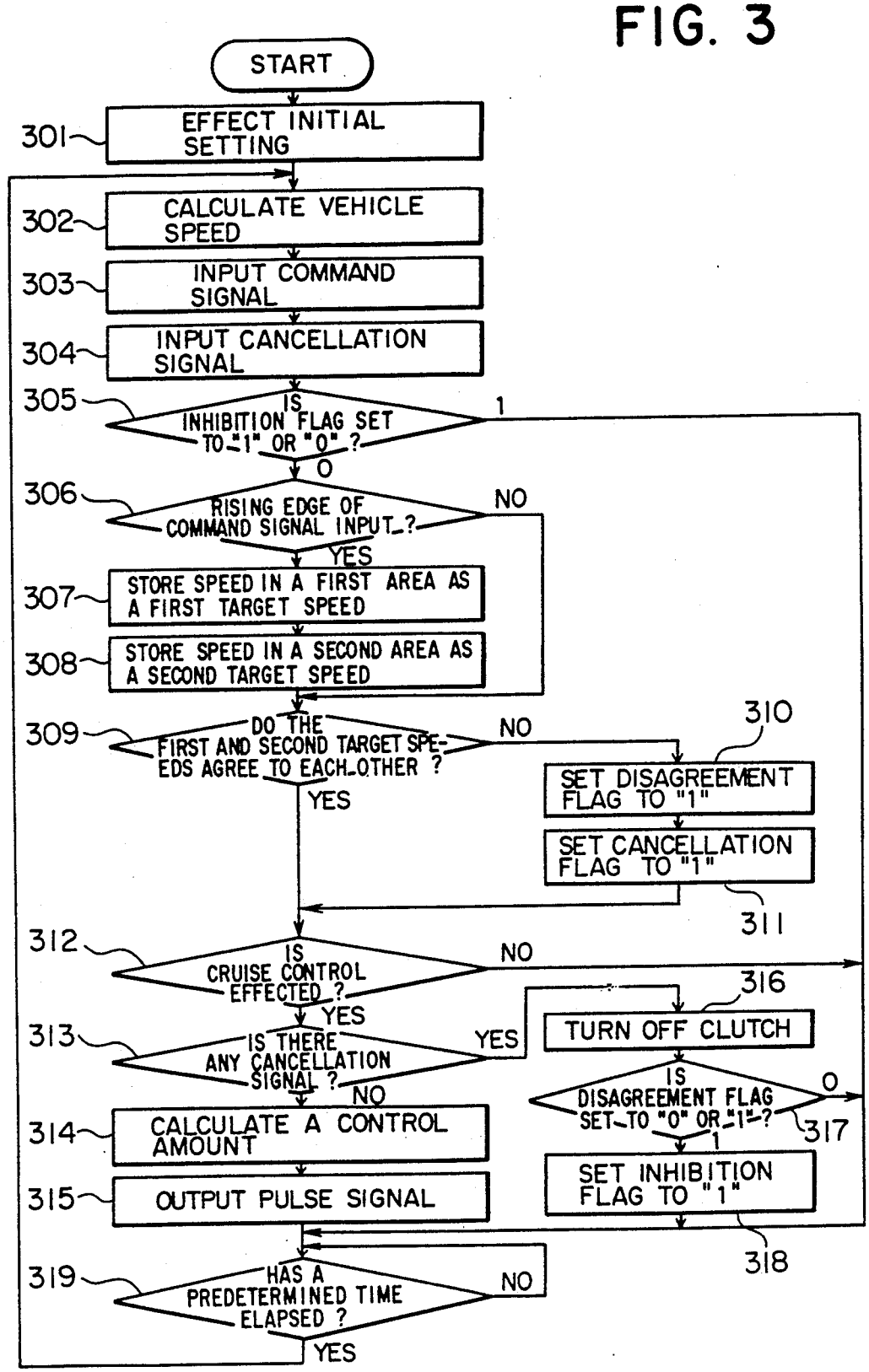
FIG. 3 is a flowchart similar to FIG. 2(a) but showing another preferred embodiment of the invention.

FIG. 3 relates to a cruise control apparatus in accordance with another embodiment of the present invention. In this embodiment, the general arrangement of the apparatus is the same as the one shown in FIG. 1, but the main program or routine stored in the ROM 6b and shown in FIG. 3 is different from that which is shown in FIG. 2(a). Referring to FIG. 3, Steps 301 through 309 are the same as Steps 101 through 109 of FIG. 2(a), and therefore a further explanation is omitted. If it is determined in Step 309 that the speeds of the vehicle read out from the first and second memory areas in the RAM 6c are equal, the control process proceeds to Step 312. On the other hand, if there is disagreement, the control process proceeds to Step 310 where a disagreement flag is set to "1", and then in Step 311 a cancellation flag is set to "1". In Step 312, it is determined whether cruise control is effected. If the answer is "YES", the control process proceeds to Step 313, but otherwise to Step 319. In Step 313, it is determined whether a cancellation signal has been inputted to the CPU 6d or whether a cruise control cancellation flag has been set to "1". If at least one of the answers to the above questions is "YES", the control process proceeds to Step 316, but otherwise to Step 314 where a control amount for the throttle valve 9 is calculated in the same manner as in the previous embodiment. Then in Step 315, the CPU 6d outputs to the throttle actuator 7 an appropriate signal in the form of a pulse corresponding to the control amount thus calculated, and thereafter the control process proceeds to Step 319. Returning to Step 316, the CPU 6d operates to release (disengage) the electromagnetic clutch in the throttle actuator 7, and in Step 317, it is determined whether the disagreement flag is set to "1". If the answer is "YES", the control process proceeds to Step 318 where the cruise control inhibition flag is set to "1", but if "NO" the control process proceeds to Step 319 where after waiting for a predetermined time, the control process returns to Step 302. Thereafter, the same operational steps are repeated as above.

In this second embodiment, if the speeds of the vehicle stored in the first and second memory areas in the RAM 6c do not agree with each other, cruise control is cancelled and thereafter cruise control is inhibited even when a subsequent cruise control command signal is issued.

In the above-described embodiments, the throttle actuator 7 is implemented as a motor-driven actuator but any known type of actuator such as a vacuum-operated actuator or the like may be employed with the same results.

What is claimed is:

1. A cruise control apparatus for a vehicle having a throttle valve and a throttle actuator, comprising:
   a speed sensor for sensing the speed of the vehicle;
   memory means for storing the vehicle speed sensed by said speed sensor in a first area as a first target speed and in a second area as a second target speed in response to an operator set command signal;
   comparison means for comparing said first target speed and said second target speed and outputting either one of said target speeds as a final target speed if the target speeds are equal, but outputting a lower one of said target speeds as said final target speed if there is disagreement therebetween;
   cruise control means connected to receive the output of said comparison means and responsive thereto for controlling the throttle actuator to move the throttle valve to a target degree of opening which corresponds to said final target speed;
   externally operated cruise control cancellation means for cancelling the cruise control operation of said cruise control means; and
   cruise control inhibition means operable to inhibit said cruise control means from being set into operation after said cruise control cancellation means is operated if there is disagreement between said first and second target speeds.

2. A cruise control apparatus for a vehicle having a throttle valve and a throttle actuator, comprising:
   a speed sensor for sensing the speed of the vehicle;
   memory means for storing the vehicle speed sensed by said speed sensor in a first area as a first target speed and in a second area as a second target speed in response to an operator set command signal;
   comparison means for comparing said first target speed and said second target speed and outputting either one of said target speeds as a final target speed if the target speeds are equal to each other, but outputting a lower one of said target speeds as said final target speed if there is disagreement therebetween;

cruise control means connected to receive the output of said comparison means and responsive thereto for controlling the throttle actuator to move the throttle valve to a target degree of opening which corresponds to said final target speed; and cruise control cancellation means operable to cancel the cruise control operation of said cruise control means if there is disagreement between said first and second target speeds.

* * * * *